Oct. 28, 1958 K. FRANK 2,857,764
ROTOR BALANCE TESTING MACHINE
Filed Jan. 13, 1956 3 Sheets-Sheet 1

INVENTOR.
KARL FRANK
BY Nicholas J. Garofalo
ATTORNEY

Oct. 28, 1958 K. FRANK 2,857,764
ROTOR BALANCE TESTING MACHINE
Filed Jan. 13, 1956 3 Sheets-Sheet 2
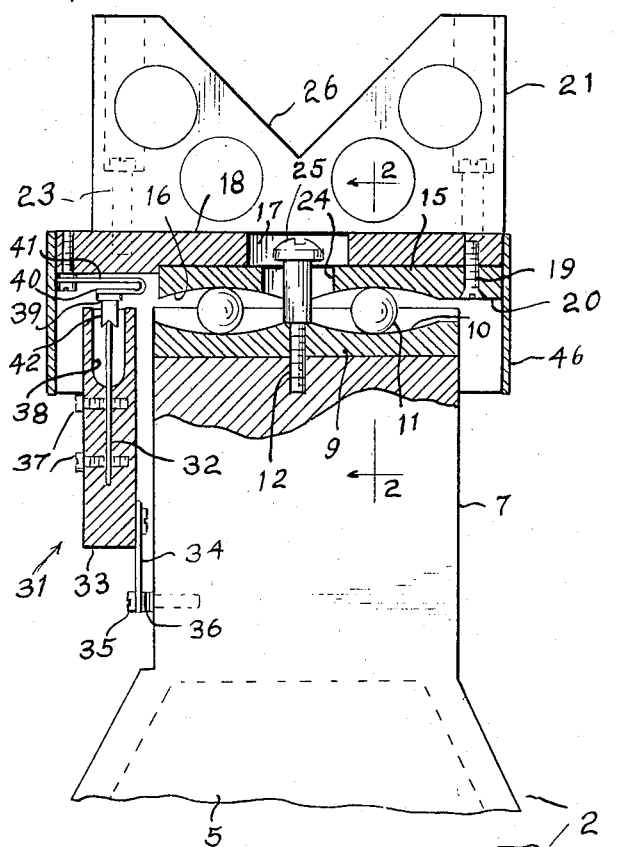
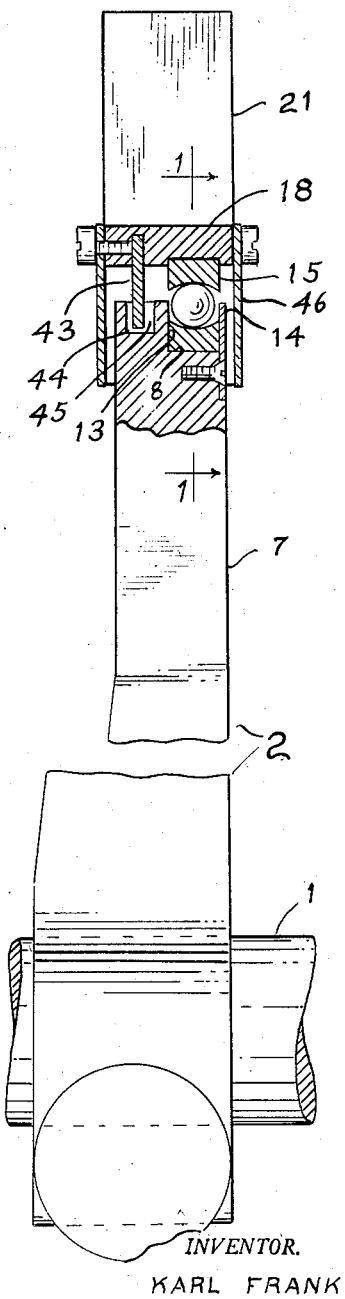
INVENTOR.
KARL FRANK
BY Nicholas J. Garofalo
ATTORNEY Oct. 28, 1958     K. FRANK     2,857,764
ROTOR BALANCE TESTING MACHINE
Filed Jan. 13, 1956     3 Sheets-Sheet 3
Fig. 6
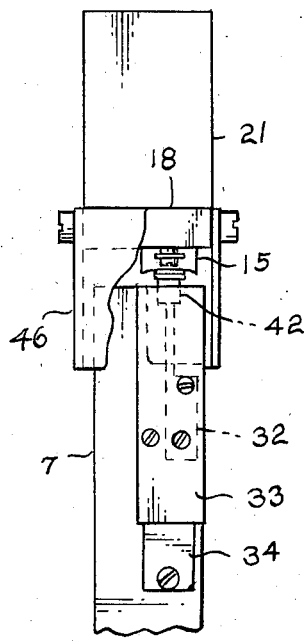
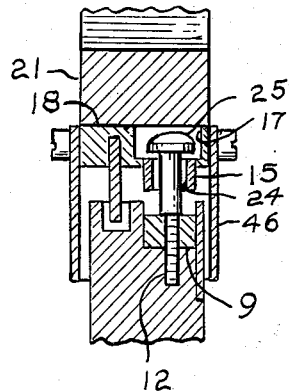
Fig. 7
INVENTOR.
KARL FRANK
BY *Nicholas J. Garofalo*
Attorney

# United States Patent Office 2,857,764
Patented Oct. 28, 1958

2,857,764

ROTOR BALANCE TESTING MACHINE

Karl Frank, Garden City, N. Y., assignor to Micro Balancing, Inc., Garden City Park, N. Y.

Application January 13, 1956, Serial No. 558,924

3 Claims. (Cl. 73—462)

This invention relates to new and useful improvements in rotor balance testing machines. Machines of this type are designed to test rotatable bodies, such as armature rotors, gyros, shafts, and the like for running balance. Lack of balance due to uneven distribution of the mass in such bodies is detected by various vibration sensitive or pick-up devices which provide resultant signals to an electrical circuit designed to indicate the existence of such unbalance. Because of various defects in the structure of conventional balance testing machines and in the form of the pick-up mechanism associated therewith, inaccuracies of varying degree are reflected in the pick-up circuit whereby the efficiency and end results of the machine are affected.

An object of this invention is, therefore, to correct such deficiencies.

Another object of this invention is to provide an improved rotor balance testing machine of a practical, compact and efficient nature.

A more particular object of this invention is to provide a rotor balance testing machine having an improved and novel supporting standard.

Another particular object of this invention is to provide structural improvements in the rotor support bearings of a balance testing machine, whereby such improvements vibration of the support in response to actions of an unbalanced rotor is dampened to eliminate undesirable frequencies in the pickup circuit.

A still further object of this invention is to provide in such a machine an efficient and highly desirable form of a vibration responsive pick-up arrangement for transmitting electrical signals to an indicator circuit.

The invention further lies in the particular structure of its component parts, as well as in their general organization and cooperative association with one another to effect the results intended.

The foregoing and other objects and advantages of this invention will appear more fully hereinafter from a consideration of the detailed description which follows, taken together with the accompanying drawings wherein an embodiment of the invention is illustrated. It is to be expressly understood, however, that the drawings are for purposes of illustration and description and are not to be construed as defining the limits of the invention.

Fig. 1 of the drawings is a longitudinal section taken on the line 1—1 of Fig. 2;

Fig. 2 is a cross section taken on the line 2—2 of Fig. 1;

Fig. 6 is taken at 90 degrees to Fig. 1; and

Fig. 7 is a fragmentary cross section through the center of Fig. 1 and directed to further illustrating the arrangement of the stud element.

Figure 3:
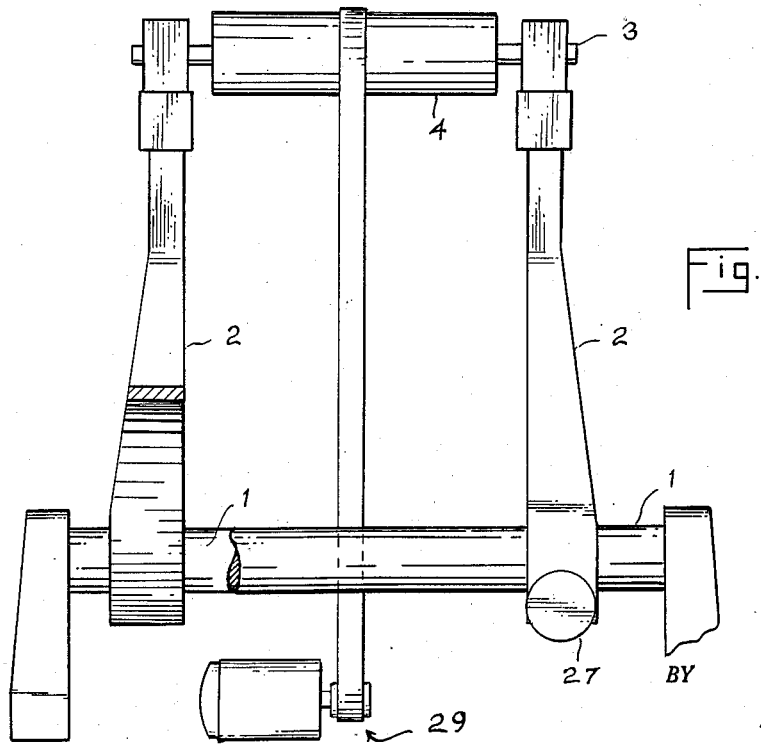
Fig. 3 is a view illustrating the machine as supporting a rotor member for balance testing.

In describing the invention in further detail, reference is directed to the several drawings, particularly to Figs. 1 to 3 wherein there is disclosed a rotor balance testing machine having a pair of horizontally disposed tracks 1 on which is mounted a pair of standards or pedestals 2. The standards are slidably adjustable along the tracks in spaced relation to one another so as to support between them the ends 3 of a rotor body 4.

A standard 2 includes a substantially triangular hollow base or body portion 5 in the base corners of which are openings 6 in which the track members are received. The upper portion of the standard terminates in a solid rectangular block portion 7 of relatively narrow thickness. The top of this block is stepped, as shown in Fig. 2, so as to provide lengthwise of the front edge thereof a shoulder or ledge 8. This shoulder is occupied by a dual bearing support plate 9 having a pair of concaved or dished wells 10 in each of which is rotatable a ball bearing 11 of lesser diameter. Plate 9 is fastened to this shoulder by a stud 12 located centrally of the plate between the wells. The lower half of the stud threads through the plate and threadedly engages in the underlying shoulder of the block. The rear portion of the block, representing substantially one-half the thickness of the block, rises above the shoulder to a height, level with the horizontal diameter of the balls and providing a vertical wall 13. The latter fences in the ball elements along the rear. A plate 14 mounted lengthwise of the front face of the block rises in parallel relation to wall 13 to an equal height, and walls the ball elements in along the front of the block.

Supported for oscillatory movement upon the ball bearings is an upper bearing plate 15 which complements the opposed bearing plate 9 and has a pair of similarly formed wells 16. Plate 15 is mounted in a keyway formed in the underside of a relatively wider dimensioned base plate 18, and is held fast therein by a bolt 19. The latter threads through a slight extension 20 at the right end of plate 15 and engages in the underside of the base plate member 18. By this structural arrangement, the fastening bolt does not interfere in any way with rotation of the ball members. Mounted to the top surface of base plate member 18 is a rectangular rotor bearing block 21. A pair of fastening bolts 23, vertically disposed in recesses formed through opposite marginal portions of block 21, threadedly engage partway into the upper portion of the base plate member 18, whereby these two members are bound fast to one another. The advantage of this construction is that there is no projection of the bolt ends into the wells of the upper bearing plate, and, consequently, there is no interference with the ball members.

The free upper portion of stud 12 projects freely through an opening 24 elongated in a longitudinal direction in the upper bearing plate. The head 25 of the stud is located in an opening 17 of greater diameter formed in base plate 18. By this arrangement, the rotor block 21 is free to oscillate in a horizontal plane upon the bearing elements. The extent of this oscillation is limited by the spacing between the stud and the wall of the opening in bearing plate 15. As shown in Fig. 7 the head of the stud is relatively larger in diameter than the narrowest dimension of the opening in bearing plate 15 and overhangs the surface of the latter whereby the rotor block is prevented from lifting in a vertical direction free of the bearing elements below.

The rotor block carries centrally thereof a V formed cutout 26. This serves as a supporting bearing for an end of the rotor element. The V formed cut-out enables rotor elements of various diameters to be accommodated therein.

In the operation of the device, the pair of standards are slidably adjusted in position relative to one another on the tracks so as to accommodate in the rotor supporting blocks the ends of the rotor element, the balance of which is to be tested. The standards are locked in their adjusted position by suitable manually operable means, generally indicated at 27.

The rotor element is rotated by a suitable belt and motor arrangement 29. As the rotor revolves, any unbalance in the ends thereof is reflected by oscillation of the V blocks on their bearings. The stud and slot structures 12 and 24 in the bearing plate members permits this oscillation to take place in a horizontal plane. The heads 25 of the stud members, overhanging and being preferably in close proximity to the upper surface of their respective plates, prevent vertical lifting of the rotor bearing blocks from the underlying bearing elements.

The oscillations of the V blocks due to unbalancing masses in the rotor element are sensed or picked up by a vibration sensitive electrical device associated with each standard. Signals generated by each pick-up device are transmitted through a suitable circuit, not shown, whereby the existence of the unbalance in the rotor is indicated.

Various forms of vibration sensitive pick-up devices may be used to electrically translate the oscillations of the V block into electrical signals for transmission to the associated intelligence circuit. The intent herein is, however, to provide a rotor supporting standard of a simple and practical nature that has a minimum of operating parts. To this end, an electrical strain gauge structure generally designated 31 and best shown in Figs. 1 and 6 is associated with each standard for sensing oscillations of the rotor element. The particular association of the strain gauge structure with the standard and the advantages derived thereby is one of the features of this invention. The strain gauge structure includes a strain gauge element 32 of conventional make, having a thin rectangular and resilient body and having incorporated therein the usual resistance elements, not shown. Element 32 is here mounted in an elongated block 33 vertically disposed alongside an end of the standard and in spaced parallel relation thereto. The block is supported by a vertical leaf spring 34, the upper end of which is fastened to the lower inner face of the block, and the lower end of which is held fast by a bolt 35 to the lower end of the standard block portion. A suitable number of washer elements 36 on the bolt space the spring 34 and, as a consequence, block 33 a desired distance from the standard. The lower portion of the strain gauge element is vertically held in a complementary slot in the body of the strain gauge block. Screw elements 37, which serve as terminals to the electrical components of the strain gauge member, also serve to rigidly hold the latter in the block. The upper portion of the strain gauge element projects freely upwards through a relatively wider recess 38 that opens through the top of the supporting block. A cap or head 39 mounted fast on the top end of the strain element has fixed thereto a horizontally disposed arm 40 of a leaf type U spring. The other 41 of the latter is slightly longer, and is disposed in close spaced horizontal relation to the underside of an extended end of the rotor bearing block base plate 18. A bolt fastens the free end of this spring arm to the marginal underside of this extended end of the base plate. By this structural arrangement, oscillations of the related rotor block are transmitted to the strain gauge. The latter, acting in response thereto, translates such oscillations into electrical signals for transmission through the associated intelligence circuit.

Since oscillations of excessive magnitude are not only unnecessary, but are also undesirable, the structural arrangement here of the pick-up device curbs the extent to which the magnitude of oscillation will be reflected in the strain gauge. This latter effect is enabled by the particular relation of the spring member 34 to the standard and by the head element 39 of the strain gauge. The head element has a short body portion 42 which depends about the strain gauge element into the recess in spaced relation to the surrounding wall of the latter. It is plain that the extent to which the strain gauge will swing in response to oscillations of the V block will be limited by abutment of the body portion 42 of the head element against the wall of the recess. Oscillations of greater magnitude, upon limiting the strain gauge element as above, will cause the block to oscillate on its supporting spring 34. By this arrangement, the strain gauge is not only limited in the extent of its swing, but is also protected by this novel supporting block arrangement against undesirable swinging and consequent damage.

Oscillation in the strain gauge of each standard creates in conventional manner electrical signals which are transmitted for processing to the associated intelligence circuit for proper indication.

Oscillation of excessive magnitude in the V block are not only unnecessary, but are also undesirable, as they might, unless checked, create undesirable frequency signals in the circuit to cloud the true signals. Here suitable means is provided to dampen the oscillatory actions of the V block and, thereby, avoid such undesirable frequencies. The damping means is of a viscous type. It comprises a damping plate 43 of rectangular proportions which is mounted fast in a keyway along the underside of the base plate member and slightly rearwardly of the upper bearing plate. The damping plate hangs downward and dips freely into an open trough 44 formed lengthwise in the top rear portion of the rotor block. This trough is filled with a high density fluid 45 so as to provide a viscous drag upon the damping plate and, as a consequence, upon the rotor block as the latter oscillates. This damping action, in restraining the magnitude of oscillation of the rotor block, minimizes the creation of undesirable frequency signals in the strain gauge element.

An apron plate 46 fastened, as by screws, to the front face of the base plate member hangs down to skirt the front and one end of the bearing plates in spaced relation thereto. A similar apron plate skirts the rear of the bearing plates and, at the other end, skirts the strain gauge block. The apron plates serve to protect the bearing elements and the strain gauge structure from attack by dirt. The spacing between the apron plates and the structures skirted thereby serves to avoid interference with the oscillatory motion of the rotor block structure.

Figure 4:
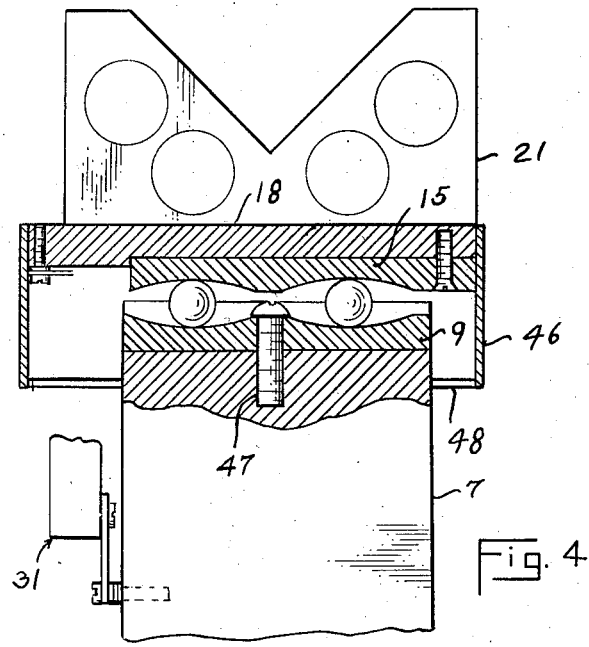
Figs. 4 and 5 are views corresponding respectively to Figs. 1 and 2, but illustrating modifications in the latter.
Figure 5:
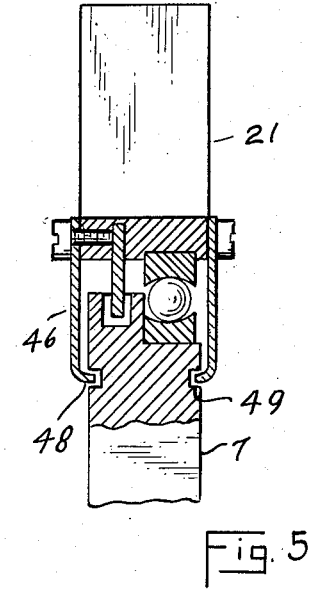

The openings 24 and 17 shown in Fig. 1, and the upper projecting portion of the stud member are eliminated in a modified structure shown in Figs. 4 and 5. In this form, a reduced size stud 47 is employed which merely serves to fasten the lower bearing plate to its shoulder. The oscillatory movement of the rotor block in this form of the invention is curbed instead by the apron plates. These are turned inward, as at 48, toward the front and rear faces of the block portion of the standard. The turned ends project freely into opposed channels 49 formed in the said faces of the standard. By this arrangement, the turned ends not only curb the extent of oscillation of the rotor block in a horizontal plane, but also in a vertical plane.

While an embodiment of the invention has been illustrated and described in detail, it is to be expressly understood that the invention is not limited thereto. Various changes can be made in the design and arrangement of the parts without departing from the spirit and scope of the invention, as the same will now be understood by those skilled in the art; and it is my intent, therefore, to claim the invention not only as shown and described, but also in all such forms and modifications thereof as may reasonably be construed to be within the spirit of the invention and the scope of the appended claims.

What is claimed:

1. In a standard of the character described for supporting an end of a rotor body and having a substantially triangular hollow base portion provided with openings in its base corners making it slidably adjustable along a pair of horizontally disposed tracks received in the openings, a solid block portion terminating the upper end of the base portion, a lower bearing plate supported upon the top surface of the block portion and having a pair of adjoining concavities in its upper surface, a bearing ball of lesser radius than the radius of said concavities rotatable in each of the concavities, a complementary upper bearing plate supported by the balls, a stud rigidly and centrally engaging the lower bearing plate to the said block and having a shank portion projecting upwards freely through a hole of relatively larger diameter formed in the upper bearing plate, a base plate fixed to the top surface of the upper bearing plate and also having an opening relatively larger than the diameter of said shank, a rotor bearing block removably fixed to the top surface of the base plate and having a V cutout centrally thereof for bearing an end of the rotor body, whereby such arrangement the rotor bearing block is adapted to oscillate in a horizontal plane upon such bearing balls in response to unbalancing masses in the rotor body, an electrical strain gauge element responsive to oscillations in the rotor bearing block, a supporting block clamping the lower half of the strain gauge element and holding the same in an erect position, a spring engaging the upper free end of the strain gauge element with the base plate for oscillation of the strain gauge element in response to oscillations of the rotor bearing block and base plate, and a spring supporting the lower end of the strain gauge supporting block on an end of the solid block portion that terminates the standard.

2. In the structure according to claim 1 wherein the block that supports the strain gauge element has an upper portion that freely surrounds the upper free portion of the strain gauge element and serves to limit the magnitude of swing of the strain gauge element as it oscillates.

3. In the structure as in claim 1 wherein viscous damping means is provided to dampen the oscillation of the rotor bearing block as it responds to unbalancing masses in the rotor body, the viscous damping means comprising a portion of the base plate overhanging the upper bearing plate in a lateral direction, a trough formed below in a lateral extension of the solid block of the standard, a high density fluid filling the trough, and a damping plate depending from the underside of the overhanging portion of the base plate and projecting into the fluid free of the walls of the trough.

References Cited in the file of this patent

UNITED STATES PATENTS

| | | |
|---|---|---|
| 2,308,950 | Hulslander | Jan. 19, 1943 |
| 2,359,245 | Ritzmann | Sept. 26, 1944 |
| 2,382,843 | Annis | Aug. 14, 1945 |
| 2,394,411 | Tolman | Feb. 5, 1946 |
| 2,547,764 | Lindenberg et al. | Apr. 3, 1951 |
| 2,594,581 | Phelps | Apr. 29, 1952 |
| 2,704,452 | Federn | Mar. 22, 1955 |
| 2,754,686 | Phelps | July 17, 1956 |
| 2,772,569 | Ruge | Dec. 4, 1956 |